United States Patent [19]
Derzhavets et al.

[11] 3,862,902
[45] Jan. 28, 1975

[54] DEVICE FOR RECEIVING WATER SURFACE FLOATING IMPURITIES

[76] Inventors: Abram Yakovlevich Derzhavets, prospekt Gagarina, 4, kv. 5; Petr Grigorievich Kogan, ulitsa Perekopskoi divizii, 2, kv. 14; Sergei Martynovich Nunuparov, ulitsa Lastochkina 5, kv. 34, all of Odessa, U.S.S.R.

[22] Filed: June 6, 1973

[21] Appl. No.: 367,396

[52] U.S. Cl............ 210/122, 210/DIG. 21, 210/128, 210/242
[51] Int. Cl............................................. B01d 33/00
[58] Field of Search ...... 210/83, 242, DIG. 21, 169, 210/121, 122, 128

[56] References Cited
UNITED STATES PATENTS

| | | | |
|---|---|---|---|
| 2,876,903 | 3/1959 | Lee | 210/242 |
| 3,142,281 | 7/1964 | Muller | 210/242 |
| 3,567,020 | 3/1971 | Whitaker | 210/169 |
| 3,630,376 | 12/1971 | Price | 210/DIG. 21 |
| 3,682,316 | 8/1972 | Waren | 210/DIG. 21 |
| 3,693,801 | 9/1972 | Pugokowski | 210/DIG. 21 |
| 3,722,688 | 3/1973 | Wirsching | 210/242 |

*Primary Examiner*—Theodore A. Granger

[57] ABSTRACT

A device for receiving water surface floating impurities in the collecting receptacle of an oil and garbage skimmer craft comprises a gate installed at the inlet to the collecting receptacle. The upper horizontal edge of the gate forms a weir above which the upper layer of water together with floating impurities is overflowing. The gate is rigidly connected to a float, whereas both the gate and the float are fixed with a possibility for free rocking around a horizontal axis, thus providing for a constant depth of immersion of the upper horizontal edge of the gate in relation to the water level in a basin being cleaned. The gate has an outside surface facing a water basis being cleaned and is given the shape of a portion of a cylinder whose axis coincides with a horizontal axis around which the gate and the float are rocking.

4 Claims, 3 Drawing Figures

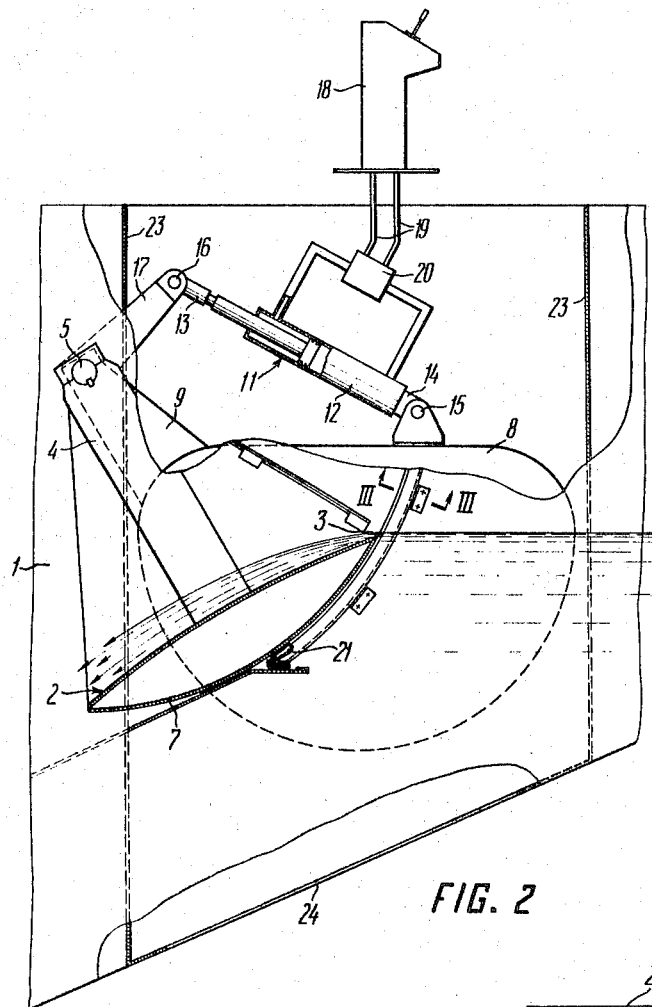
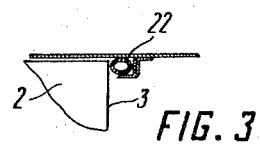
FIG. 2
FIG. 3

DEVICE FOR RECEIVING WATER SURFACE FLOATING IMPURITIES

The present invention relates to the equipment for cleaning the surface of water basins, such as in ports, docks, coves, of floating impurities, for example oil and oil products mixed with garbage, and is particularly concerned with devices for receiving water surface floating impurities in the collecting receptacle of oil and garbage skimmer craft.

Oil and garbage skimmer craft are known having devices for receiving water surface floating impurities in a collecting receptacle, comprising a gate which maintains the predetermined depth of the upper layer of water together with floating impurities overflowing to said collecting receptacle.

An advantage of the devices of this type lies in a possibility for simultaneous receiving of oil and garbage in a collecting receptacle where they can be accumulated and separated.

A device is known, for example, for receiving water surface floating impurities in a collecting receptacle of oil and garbage skimmer craft, employed in floating oil and garbage skimmer craft. This device incorporates a gate installed at the inlet to the collecting receptacle of said oil and garbage skimmer craft, and provided with an actuator to regulate the height positioning of its horizontal edge forming a weir above which the top layer of water together with floating impurities is overflowing to said collecting receptacle. The gate is controlled by means of a hand-driven actuator.

In cleaning the surface of a water basin this gate is located in the required position at which the upper layer of liquid together with floating impurities is overflowing above the upper edge of the gate into a collecting receptacle and the depth of said upper layer of liquid overflowing above the gate is predetermined with regard to the nature of surface fouling of a water basin.

The known device, however, inheres a disadvantage in that in altering the running speed or in maneuvering of the oil and garbage skimmer craft, the depth of the layer of water overflowing to the collecting receptacle is also changed causing either interruptions in the inflow of impurities or the undesirable inflow of surplus water. In addition, similar disturbances in the operation of the device also occur due to the action of waves, rolling of the oil and garbage skimmer craft and changing its draught.

Also known in a device for receiving water surface floating impurities in a collecting receptacle of oil and garbage skimmer craft which also incorporates a gate in the form of a float with a horizontal upper edge above which the upper layer of water together with floating impurities is overflowing to said collecting receptacle. In the operation of this device, the upper edge of said gate is maintained at the predetermined level, thus keeping constant the depth of the layer of water overflowing to the collecting receptacle of the oil and garbage skimmer craft under changing level of the surrounding water and varied draught of the oil and garbage skimmer craft. However, in maneuvering or changing running speed of the oil and garbage skimmer craft the gate undergoes alternating hydrodynamic effects resulting in changed positioning of the upper edge of the gate in relation to the level of the surrounding water and, as a consequence, the inflow of impurities to the collecting receptacle is discontinued or the latter receives excessive amount of water.

It is therefore, an object of the present invention to provide a device for receiving water surface floating impurities in the collecting receptacle of the oil and garbage skimmer craft, which would be able to maintain the constant predetermined depth of the layer of water overflowing to the collecting receptacle under the conditions of rough sea and changing draught of the oil and garbage skimmer craft and also when the gate undergoes alternating hydrodynamic forces caused by wave impact, changed running speed and maneuvering of the oil and garbage skimmer craft.

This object is achieved due to the provision of a device for receiving water surface floating impurities in the collecting receptacle of the oil and garbage skimmer craft, according to the invention, comprising: a gate installed at the inlet to the collecting receptacle, having an upper horizontal edge forming a weir above which the upper layer of water together with floating impurities is overflowing, said gate installed adjacent to the walls of said collecting receptacle and fixed with a possibility for free rocking a round a horizontal axis and having an outside surface facing a water basin being cleaned, made in the form of a portion of a cylinder whose axis coincides with said horizontal axis around which the gate is rocking; at least one float fixed with a possibility for rocking relative of said horizontal axis around which said gate is rocking and rigidly connected to said gate, thus providing for a constant depth of immersion of said upper horizontal edge of the gate with respect to the water level of a basin being cleaned with a resultant constant depth of the upper layer of water overflowing to said collecting receptacle.

It is feasible that rigid connection between said gate and said float is made with a possibility for adjusting their relative angular positioning in relation to said horizontal axis around which they are rocking with resultant provision for varying the immersion depth of the upper horizontal edge of said gate in relation to the water level in a water basin being cleaned.

It is desirable that a device would incorporate a link adjustable in length to pivotally connect the gate to the float and to effect the above mentioned rigid connection between the gate and the float.

Adjustment and fixing of said link may be effected by means of a hydraulic cylinder with a hydraulic lock, the cylinder constituting a part of said rod.

A device should incorporate a seal located between the gate and the adjacent walls of the collecting receptacle to prevent water inflow to the collecting receptacle and permit rocking of the gate.

The float should be positioned in an enclosure, open in the bottom, to protect the float against hydrodynamic effects on the part of the surrounding water.

A device pursuant to the present invention provides for the uniform inflow of the layer of water of the predetermined depth containing floating impurities to the collecting receptacle of the oil and garbage skimmer craft due to the incorporation of the float rigidly connected to the gate and folliwing changed level of the surrounding water and changed draught of the oil and garbage skimmer craft. The cylindrical outer surface of the gate with a geometric axis of a cylinder coinciding with the gate rocking axis compensates for a major proportion of hydrodynamic forces acting on the cylindrical surface of said gate due to their normal component direction crossing the horizontal axis of said gate rocking.

The enclosure provided for the float with a hole in its bottom portion protects said float against hydrodynamic effects on the part of the surrounding water.

The invention will now be defined through the description of its actual embodiments with reference to the accompanying drawings, in which:

FIG. 2 is a section along II—II of the FIG. 1;

FIG. 3 is a section along III—III of the FIG. 2;

Figure 1:
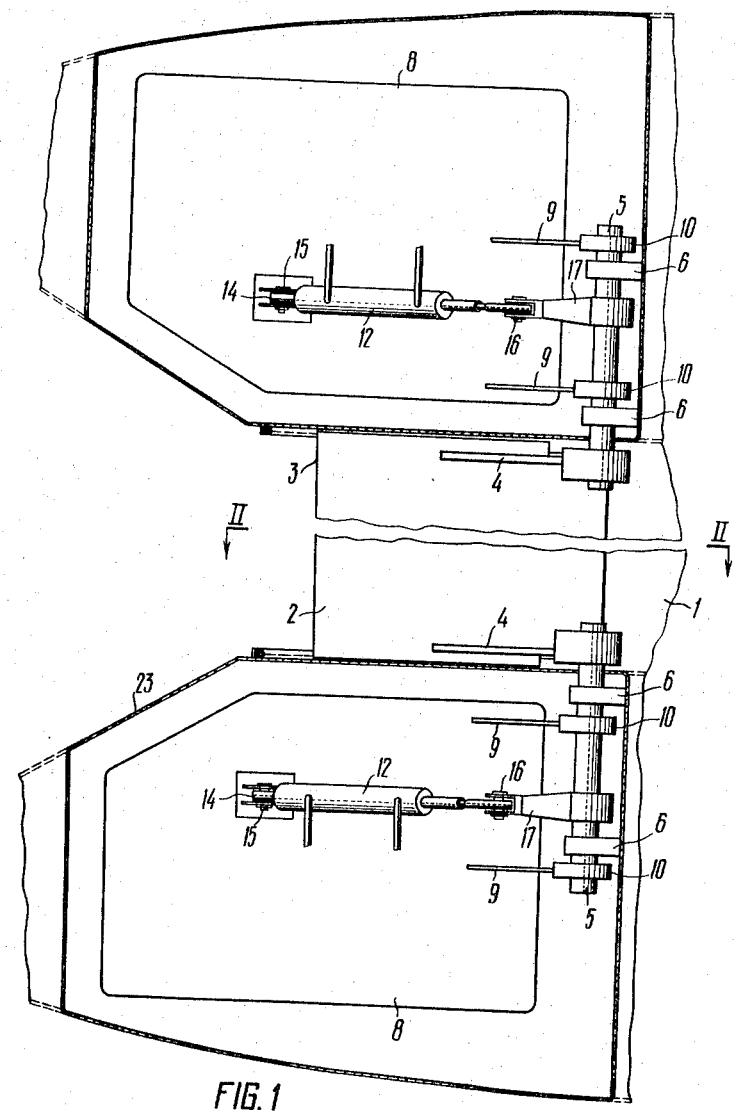
FIG. 1 is a schematic representation in plan of a device for receiving water surface floating impurities, according to the invention.

A device for receiving water surface floating impurities in a collecting receptacle 1 (FIG. 1) of the oil and garbage skimmer craft comprises a gate 2 installed at the inlet to the collecting receptacle 1. The upper horizontal edge 3 (FIGS. 1, 2) of the gate 2 forms a weir above which the upper layer of water together with floating impurities is overflowing. The gate 2 is adjacent to the walls of the collecting receptacle 1 and is rigidly secured by means of levers 4 on shafts 5 given possibility for rotation in bearings 6 (FIG. 1) whose axis coincides with the axis of rocking of the gate 2. The gate 2 in its cross section takes the form of a streamlined body whose outer surface 7 (FIG. 2) facing a water basin being cleaned is shaped as a portion of a cylinder whose axis coincides with the axis of bearings 6. The device also incorporates floats 8 positioned at both sides of the gate 2 and pivotally connected to shafts 5 by means of levers 9 which mount bearings 10 (FIG. 1) whose axes are those for the floats 5 to rock around and are coaxial with bearings 6.

The float 8 alone would be enough to employ if the gate 2 is of small dimensions.

The device incorporates a link 11, adjustable in length, to effect the rigid connection between the gate 2 and the floats 8. A hydraulic cylinder 12 is built in the link 11 to vary the length of this link and by this way altering the relative angular positioning of the gate 2 and the floats 8.

Portion 13 (FIG. 2) of the link 11 is rigidly connected to the rod of the hydraulic cylinder 12, while portion 14 of the link 11 is connected to the casing of the cylinder.

The link 11 is connected to the floats 8 by means of a pivoted joint.

Connection of the link 11 to the gate 2 is effected by means of a pivoted joint 16 and a lever 17 rigidly fixed on the shaft 5.

Displacement of the rod of the hydraulic cylinder 12 to alter the length of the link 11 is performed by the medium of oil forced by pressure to the chamber of the hydraulic cylinder 12 through a control member 18, pipe line 19 and hydraulic lock 20 to fix the link 11 together with the built-in hydraulic cylinder 12 in the required position. The hydraulic lock 20 may be provided by using any suitable method known in the art. An oil pressure source may take any form known and is not shown in the drawings.

Any other suitable method may be employed to effect rigid, and adjustable in length, connection between the gate 2 and the float 8.

Installed between the cylindrical surface 7 of the gate 2 and the adjacent walls of the collecting receptacle 1 are seal 21 and seal 22 (FIG. 3) made from rubber or plastic to prevent the surrounding water from getting into the collecting receptacle 1 (FIG. 2) and at the same time allow free rocking of the gate 2.

Floats 8 are positioned in an enclosure 23 communicating with the surrounding water through a hole 24 in its bottom portion. The enclosure 23 protects the floats 8 against hydrodynamic effects caused by wave impacts and maneuvering of the oil and garbage skimmer craft.

The device for receiving water surface floating impurities in the collecting receptacle of the oil and garbage skimmer craft operates as follows.

The water level in the collecting receptacle 1 of the oil and garbage skimmer craft is reduced to the level of the surrounding water with the help of any known device and is further maintained unchanged.

The gate 2 by means of oil pressure delivered to the hydraulic cylinder 12 through the control member 18, pipe lines 19 and hydraulic lock 20 is set and fixed in a position at which the upper edge 3 of the gate 2 is located below the level of the surrounding water by a value setting determined by the operator of the oil and garbage skimmer craft. Under these conditions the upper layer of water containing floating impurities is overflowing above the upper edge 3 of the gate 2 to reach the collecting receptacle 1.

If the level of water surrounding the gate 2 is changed due to waves or altered draught of the skimmer craft, the floats 8 come under the action of correspondingly changed hydrostatic forces. This results in the floats 8 going up or down to change the position of the gate 2 through the link 11, lever 17 and shaft 5. With this action, the upper edge 3 of the gate 2 is kept in approximately constant position relative of the surrounding water level, thus maintaining the approximately constant depth of the layer of water overflowing above the upper edge 3 of the gate 2 to the collecting receptacle 1.

When the gate 2 is affected by variable hydrodynamic forces caused by wave impacts, changed speed or running direction of the oil and garbage skimmer craft, a larger component of these forces will aquire the direction crossing the axis of rocking of the gate 2 and this will result in that the torque of this component in relation to the axis of rocking of the gate will be equal to zero.

The component of the hydrodynamic forces tangential to the outer surface 7 of the gate 2 is determined exclusively by the force of hydrodynamic friction of water and the surface 7 and, consequently, the torque of this component in relation to the axis of rocking of the gate 2 will be insignficant in value and will produce negligible effect on the position of the upper edge 3 of the gate 2. The influence of said hydrodyanmic forces on the position of floats 8 will be also immaterial because the latter are located in the enclosure 23 with the hole 24 in its bottom portion.

The operator can vary positioning of the gate 2 by actuating the control member 18 to engage the hydraulic cylinder 12, thus changing the position of the edge 3 of the gate 2 depending on the predetermined depth of the layer of water overflowing to the collecting receptacle 1, and the nature of floating impurities.

The operator can also lower down the upper edge 3 of the gate 2 to admit large floating objects to the collecting receptacle 1, or to raise the gate 2 above the water level to protect the collecting receptacle 1 against flooding when the oil and garbage skimmer is running at full speed.

What is claimed is:

1. A device for receiving water surface floating impurities in the collecting receptacle of an oil and garbage skimmer craft, comprising: a gate installed at an inlet of the collecting receptacle and having an upper horizontal edge forming a weir, the upper layer of water together with flowing impurities being adapted to overflow the weir, said gate being located adjacent to the walls of said collecting receptacle; means supporting said gate for free rocking movement about a horizontal axis, said gate having an outer surface facing a water basin which is being cleaned, said surface comprising a portion of a cylinder having a longitudinal axis coextensive with the rocking axis of said gate; at least one float fastened for rocking movement about said horizontal gate rocking axis; a link forming a pivotal connection between said gate and said float, said link providing a rigid connection therebetween; a hydraulic cylinder having a hydraulic lock positioned in said link, said cylinder providing for variation and setting in the length of said link whereby the immersion depth of said upper horizontal edge of said gate can be controlled with respect to the water level in the water basin which is being cleaned.

2. A device as claimed in claim 1, said gate having a streamlined body configuration in cross-section.

3. A device as claimed in claim 1, comprising a seal between said gate and the walls of said collecting receptacle adjacent thereto, said seal preventing water leakage into said collecting receptacle while permitting rocking movement of said gate.

4. A device as claimed in claim 1, said gate being located in an open-bottomed enclosure, said enclosure protecting said float against hydrodynamic effects caused by surrounding water of said basin.

* * * * *